United States Patent [19]

Harris et al.

[11] Patent Number: 4,593,221
[45] Date of Patent: Jun. 3, 1986

[54] ELECTRIC MOTOR BRUSH BOX WITH STRESSED OPPOSING WALLS

[75] Inventors: David Harris, Wolsingham; Alan Hays, Spennymoor, both of England

[73] Assignee: Black & Decker Inc., Newark, Del.

[21] Appl. No.: 675,139

[22] Filed: Nov. 27, 1984

Related U.S. Application Data

[62] Division of Ser. No. 456,701, Jan. 10, 1983, Pat. No. 4,498,230.

[30] Foreign Application Priority Data

Jan. 8, 1982 [GB] United Kingdom ............... 8200514

[51] Int. Cl.⁴ ........................................... H02K 13/00
[52] U.S. Cl. .................................. 310/242; 29/597; 310/239
[58] Field of Search ............... 310/238, 239, 240, 241, 310/242, 244, 245, 246, 247, 248, 249; 29/596, 597

[56] References Cited

U.S. PATENT DOCUMENTS

| | | | |
|---|---|---|---|
| 1,239,056 | 9/1914 | Sparks | 310/247 |
| 3,387,155 | 6/1968 | Krulls | 310/245 |
| 3,656,018 | 4/1972 | Maher | 310/242 |
| 3,983,432 | 9/1976 | Rankin | 310/242 |
| 4,355,254 | 10/1982 | Oki et al. | 310/242 |

Primary Examiner—Patrick R. Salce
Assistant Examiner—D. L. Rebsch
Attorney, Agent, or Firm—Ronald B. Sherer; Edward D. Murphy; Harold Weinstein

[57] ABSTRACT

An electric motor adapted to be assembled automatically with the minimum of manual handling has a brush box sub-assembly having a brush box with two opposed side walls and containing a brush. The two opposed side walls are stressed to grip and hold the brush against movement, the brush being released for movement in the brush box by separating sufficiently the opposed side walls upon insertion in the electric motor. Preferably, the brush box has a slot between the opposed side walls and a member in the motor is forced into the slot to separate the side walls. In assembling the motor, its stator is located on an end cap, the rotor inserted into the stator, and then the distance measured between an end face of the stator and a location on the shaft of the rotor; subsequently a shaft bearing in that end cap is pressed inwards an amount related to the measured distance to determine the end float of the shaft. The end caps of the motor are both located directly on the end faces of the stator and have an open structure.

12 Claims, 21 Drawing Figures

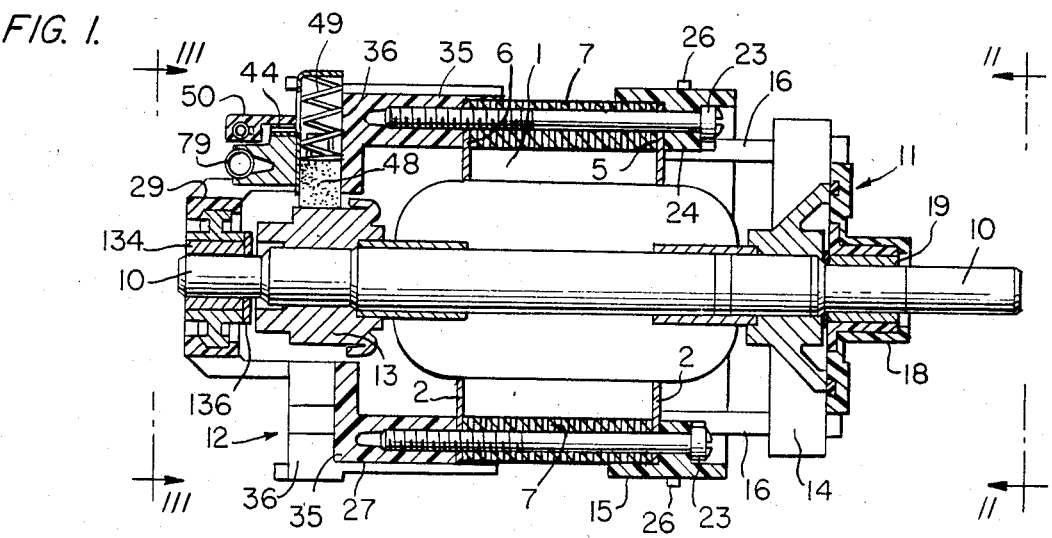
FIG. 1.
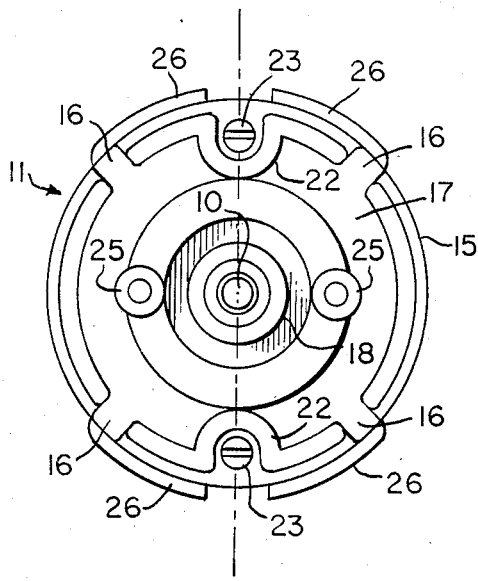
FIG. 2.
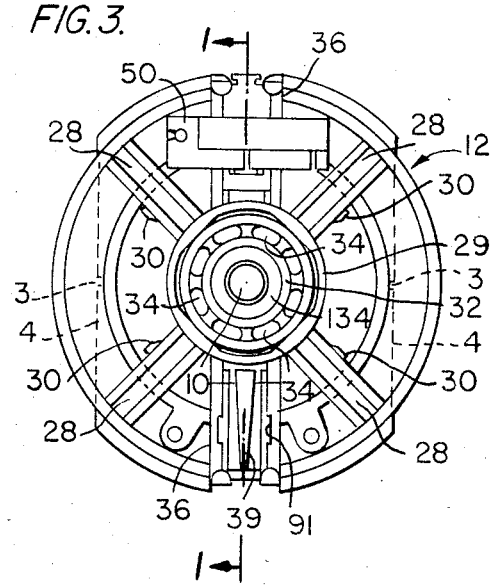
FIG. 3.
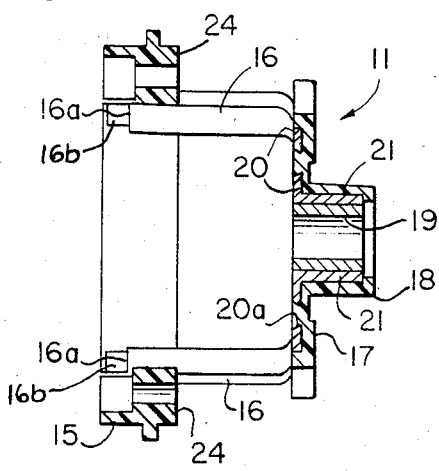
FIG. 4.
FIG. 5.

ELECTRIC MOTOR BRUSH BOX WITH STRESSED OPPOSING WALLS

This is a division of application Ser. No. 456,701, filed Jan. 10, 1983, now U.S. Pat. No. 4,498,230.

FIELD OF THE INVENTION

The invention relates to electric motors, components thereof, and to methods of assembling electric motors and components thereof, and is particularly directed towards facilitating automatic assembly by machinery with the minimum of manual handling.

BACKGROUND OF THE INVENTION

Over the years many different constructions of electric motors have been used or proposed. As the need to reduce the cost of motors and to facilitate their assembly became apparent, much attention has been given to developing electric motor components and their assembly. However, the need to facilitate automatic assembly and minimize manual handling still exists. One of the problems that occurs is that as more components are made by mass production, accumulation of tolerances occurs during final assembly that can produce unsatisfactory products. To avoid this, it is necessary to manufacture the components to closer tolerances at an increase in cost, and/or to include more manual handling of the components during the final assembly also at an increase in cost.

The present invention is concerned with some of the problems involved in more fully automating the assembly of electric motors.

SUMMARY OF THE INVENTION

One of the objects of the present invention is to produce electric motor components of economic designs and to facilitate the automatic assembly of the electric motor by machinery.

A feature by which this is achieved is the provision of a brush box assembly that retains the brush in the brush box and allows the brush to be released out of the brush box during assembly in the electric motor. This has the advantages of greatly facilitating handling of the brush box assembly and simplifying its insertion into the electric motor.

Another feature by which this is achieved is the provision of a choke in the form of a cartridge fuse which can be inserted between a field winding terminal and a brush terminal by simply inserting it in slotted contact tongues.

Another object of the invention is the provision of an electric motor which is of economic construction and which can be assembled automatically with the minimum of manual handling.

A feature by which this is achieved is the provision of location surfaces on the end caps and directly assembling the end caps over the end faces of the stator, and constructing the end caps with an open structure. This has the advantage of more accurately positioning the end caps and rotor bearings supported therein, and of allowing access for assembly of other components after assembly of the end caps.

Another feature by which automatic assembly is advanced is the measuring of the distance between an end face of the stator and a specific location on the rotor shaft during assembly of the second end cap on the stator, and subsequently moving the bearing in the other end cap by pressing it inwards an amount related to the measured distance to determine the end float of the rotor shaft. This has the advantage of controlling this end float to within tight tolerances even though there may have been an unacceptable build up of tolerances during earlier assembly steps.

Therefore, according to one aspect of the invention there is provided a brush box sub-assembly for an electric motor, comprising a brush box having at least two opposed side walls, a brush located within the brush box, resilient means stressed between the brush box and the brush for urging the brush outwardly in a longitudinal direction from within the brush box, and said two opposed side walls being stressed to grip and hold against movement said brush. When the opposed side walls are separated sufficiently upon insertion of the brush box sub-assembly in the electric motor, the brush can move freely in said brush box under the influence of the resilient means.

Preferably, the brush box has a longitudinal slot defined therein and disposed between the two opposed side (or top and bottom) walls to enable those side walls to be separated sufficiently when a member is forced into the slot. Conveniently the member can be part of a box support into which the brush box is inserted. There may be more than one slot, for example two slots each in opposing peripheral portions of the brush box.

With this sub-assembly, the brush can be, initially, located completely within the box and held in that position entirely by the gripping action of the opposed sides of the box, no other retaining or brush gripping means being required.

Also, according to another aspect of the invention there is provided a method of assembling an electric motor, comprising the steps of press fitting a first bearing into a first end cap, supporting the first end cap, locating an end face of a stator against the end cap, inserting a rotor having a shaft into the stator with one end of the shaft passing into the bearing, measuring the distance between the opposite end face of the stator and a location on the shaft, and positioning a second end cap containing a second bearing over the other end of the shaft. Then advancing the second end cap relative to the other end of the shaft to engage the shaft in the second bearing, until the second end cap is located against the opposite end face of the stator. Subsequently pressing the second bearing into the second end cap in the direction of the first end cap an amount related to the measured distance to determine the end float of said shaft.

The location on the shaft which is measured relative to the stator end face may be a side of a thrust washer directed towards that end face and previously assembled on the shaft.

The invention also provides electric motors incorporating the above features, and electric motors made by the above methods.

For instance, the electric motor can have first and second end caps mounted directly on the ends of a laminated stator stack, with location surfaces on the end caps seated upon the end faces of the stator stack and an annular portion of each end cap engaging over the ends of the stator stack. The first end cap can incorporate a pair of brush box mountings of channel form with a wall of each channel having an upstanding member protruding therefrom and engaging in a slot in a brush box inserted in the channel. The upstanding member forces opposite walls of the brush box apart to release the brush in the brush box and allow the brush to move under the action of a spring into engagement with the commutator of the motor.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 1 is a longitudinal section through a motor according to the invention on the line I—I of FIG. 3;

FIGS. 2 and 3 are end views of the motor of FIG. 1 looking in the directions respectively of arrows II—II and III—III in FIG. 1;

FIG. 4 is a side view in section of the end cap on the right in FIG. 1;

FIG. 5 is a side view in section of the end cap on the left in FIG. 1;

DETAILED DESCRIPTION OF THE PREFERRED EMBODIMENTS

Figure 6:
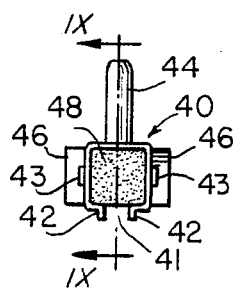
FIGS. 6, 7 and 8 are, respectively, an end view, plan view and underneath view of a brush holder of the motor.
Figure 7:
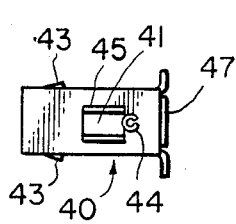

Referring first to FIGS. 1 to 5, there is shown a commutator motor, for example a universal motor, comprising a stator having a laminated stator stack 1. The laminated stator stack is formed internally with pole pieces (not shown) around which are located the conventional field windings (not shown).

The individual laminations of the stator stack 1 are accurately formed of iron pressings assembled in carefully aligned manner and welded together along guide channels 3 formed in flat side edges 4 of the laminations (see FIG. 3). In this way, the stator stack provides outer end faces 5, 6 which form reference surfaces for end caps to be described in detail below. The stator stack 1 has several, preferably two, longitudinal passageways 7 extending through the length thereof, as are shown in FIG. 1. Ring-like terminal blocks 2 of plastics material are attached to opposite ends of the stator stack 1 and form part of the stator assembly. The ends of the field windings are attached to two pairs of terminal posts that are located in the terminal block 2 on the left in FIG. 1. The terminal blocks 2 have mounting lugs that are located in additional longitudinal passages in the stator stack 1. A suitable form of terminal block is described in U.K. Patent Specification No. 1,482,470, the contents of which are hereby incorporated herein by reference.

The rotor or armature 9 of the motor is mounted upon a shaft 10, itself rotatably mounted in end caps 11, 12 of a suitable plastics material, for example glass filled nylon. Also secured to the shaft 10 adjacent one end thereof is a commutator 13, while a fan 14 is secured to the shaft 10 adjacent the other end thereof. The fan 14 is the conventional cooling air flow fan and may be, for example, a radial flow fan.

End cap 11 (FIGS. 2 and 4) comprises an annulus 15 from which axially extend four equi-spaced fingers 16 that support a disc-like end member 17 in axial spaced relationship with the annulus 15. Integral with the end member 17 is a hollow boss 18 containing a plain bearing 19. Molded into the surface of the end member 17 is a die-cast, metal heat sink 20 also of generally disc-like form with a tubular extension 21 in thermal contact with the plain bearing 19. The heat sink has a plurality of apertures 20a which assist in retaining it in position in the end member 17. The bearing 19 is a press fit in the tubular extension 21 of the heat sink.

The end member 17 is cut away at diametrically opposed sites 22 to give access to bolts 23 that secure the end cap 11 to the stator stack 1. To locate the end cap 11 on the end face 5 of the stator stack 1, the end cap 11 has internal individual ledges 16a formed at the inner ends of the fingers 16 and these ledges contact the end face 5 when the cap 11 is correctly seated upon the end face with the annulus 15 closely encircling the end face 5 and the outer surface of the stator stack adjacent the end face 5. The adjacent terminal block 2, the periphery of which is disposed between the stator stack 1 and the end cap 11, has cutaways that allow the ledges 16a to seat on the metal end face 5. Additionally, internal apertured bosses 24 provide the means for securing the end cap 11 to the stator stack 1 by bolts 23 passed through the holes in the bosses 24.

Further bosses 25 (see FIG. 2) that project one on each side of the central boss 18 provide means for locating the end cap 11 within the casing of a power tool to be driven by the motor, location being assisted by centrally gapped flanges 26 that project outwardly from annulus 15 and extend over about 60° of arc.

End cap 12 (FIGS. 3 and 5) also comprises an annulus 27 from which axially extend four fingers 28 that converge inwardly to support an end boss 29 axially spaced from the annulus 27. The fingers 28 are of a channel-shaped cross-section in a plane normal to their length for strength. Each finger incorporates small studs 30 (see FIG. 3) whose purpose will be described below.

Moulded into the end boss 29 is a die-cast metal heat sink and bearing support having an outer annulus 31 and an inner annulus 32 connected and supported in spaced relationship by a web 33 apertured as indicated at 34 in FIG. 3. The inner annulus 32 supports a plain bearing 134 through which shaft 10 extends. The apertures 34 permit flow of cooling air through the web 33 of the heat sink.

Extending longitudinally from annulus 27 are supports 35 to whose inner ends are secured supports 37 that stem from the end boss 29. The supports 35 have tapered blind bores 38 into which are screwed the bolts 23, the latter having self-tapping screw threads.

Formed internally of the annulus 27 at the ends of the fingers 28 are individual locating surfaces 28a which, when the end cap 12 is correctly seated with the annulus 27 closely encircling the end face 6, contact the end face 6, the cap 12 being held in position by the bolts 23. The adjacent terminal block 2 has cut-aways that allow the surfaces 28a to seat on the metal end face 6.

Two brush assembly mountings 36 are formed integrally with the end cap 12. The mountings 36 are of channel form open at both ends and are sized to receive brush boxes, one only of which is shown in section in FIG. 1 but which will be described below. The channels of the mountings 36 are diametrically aligned and the open side of each channel faces outwards, away from annulus 27 in the axial direction of the end 29. The floor of each channel mounting 36 has an upstanding rail 39 wedge-shaped at its outer end as can be seen in the lower part of FIG. 3. The sidewalls of the channels each have a dent 91 in the form of a shallow recess or notch intermediate the length thereof as shown in FIG. 3.

Figure 8:
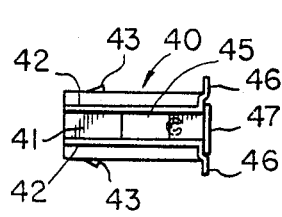
Figure 9:
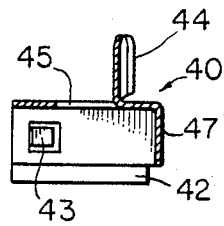
FIG. 9 is a section on the IX—IX of FIG. 6 with the brush omitted.

FIGS. 6 to 9 show a brush box 40. The box is a one-piece metal pressing with a longitudinal slot-like opening 41 along one side, the opening 41 being bounded by two outwardly turned flanges 42. Pressed out of two opposite side walls of the box 40 are tongues 43, while a terminal tag 44 is pressed out of the fourth side wall of the box, leaving a hole 45. The terminal tag 44 is formed into a cylindrical configuration, open at one side, as can be appreciated from FIG. 7. End flanges 46 extend outwardly at the one closed end 47 of the box as can be seen in FIGS. 6 and 8. The two end flanges 46 extend in opposite directions from the two side walls having the tongues 43. As can be seen, the terminal 44 is intermediate the length of the box 40, and the tongues 43 are towards the opposite end of the box to the flanges 46.

Each box 40 contains a carbon brush 48 and a helical spring 49 (see FIG. 1) which, in use, urges the brush into electrical contact with the commutator 13. The side walls of each brush box 40 are stressed inwardly slightly so that they grip the carbon brush 48 tightly and hold the latter wholly within the box against the action of the spring 49 located between the brush 48 and the end wall 47 of the box 40. At a point in the assembly cycle to be described below, when the box 40 is entered into the mounting 36, the rail 39 passes between the flanges 42, the wedge-shaped end of the rail 39 forcing the flanges and thus the side walls apart, so allowing the brush to move more freely and assume an operative position under the influence of the spring 49 as shown in FIG. 1, one end of the brush projecting from the box into electrical contact with the commutator. The height of the rail 39 from the floor of the channel support 36 is approximately equal to the distance by which the flanges 42 extend outwardly from the brush box 40 so that the rail or rib 39 does not contact the carbon brush 48.

Turning now to FIGS. 10 to 13, to enable the appropriate electrical connections to be made to both the field windings and the brushes, a carrier 50 is provided and this accommodates electrical connectors that make the desired connections.

Figure 10:
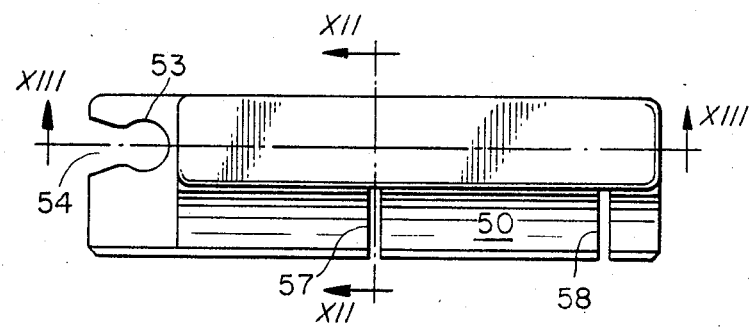
FIGS. 10 and 11 are respectively, a plan and underneath view of a further component.
Figure 11:
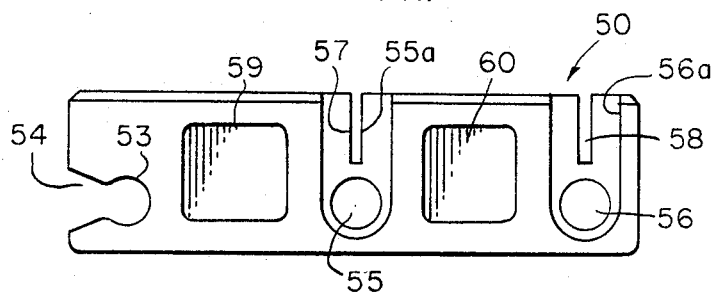

Carrier 50 comprises a block of a suitable insulating material, for example polycarbonate. Along the top of the block is a raised passageway 51 open at both ends and formed with a central keyway 52. As can be seen from FIG. 13, the passageway 51 does not extend for the full length of the block. At one end, the block has a passageway 53 open not only at both ends but also along the length thereof as indicated at 54, the sides of the block bounding the opening converging as indicated in FIGS. 10 and 11. The passageway 53 is at right angles to the passageway 51.

Figure 12:
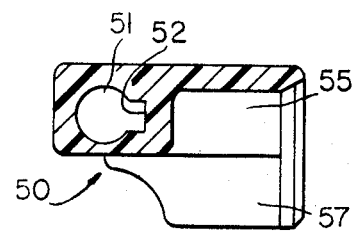
FIG. 12 is a section on the XII—XII of FIG. 10.
Figure 13:
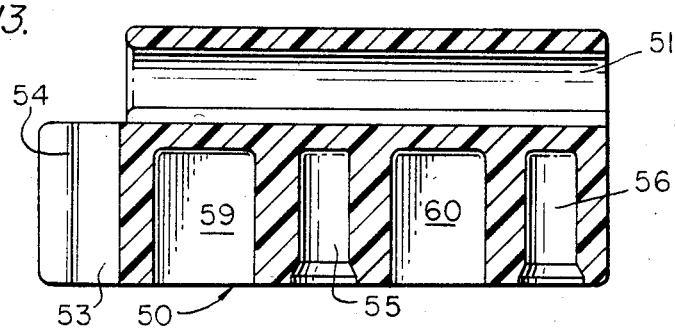
FIG. 13 is a section on the line XIII—XIII of FIG. 10.

Extending inwardly of the block 50 from the base thereof are blind passageways 55 and 56 whose lower ends are belled slightly as can be seen from FIGS. 11, 12 and 13. Extending from the lower ends along the face of the block are shallow recesses 55a, 56a.

Bore-like passageways 55 and 56 communicate with slots 57, 58 respectively. Blind recesses 59, 60 of rectangular cross-section are formed in the bottom face of the carrier 50 adjacent passageways 55 and 56. As can be seen in FIGS. 11 and 13 the passageway 55 is approximately midway along the length of the carrier 50, the passageway 56 is adjacent one end and the passageway 53 is adjacent the opposite end of the carrier 50. The two passageways 55, 56 and the passageway 53 are all parallel and extend parallel to the axis of the rotor 9 when the carrier 50 is mounted in position as shown in FIG. 1.

Figure 14:
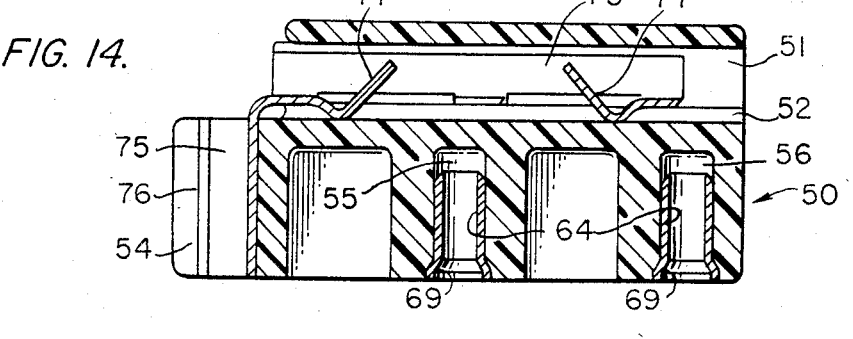
FIG. 14 is a section on the line XIV—XIV of FIG. 15.
Figure 15:
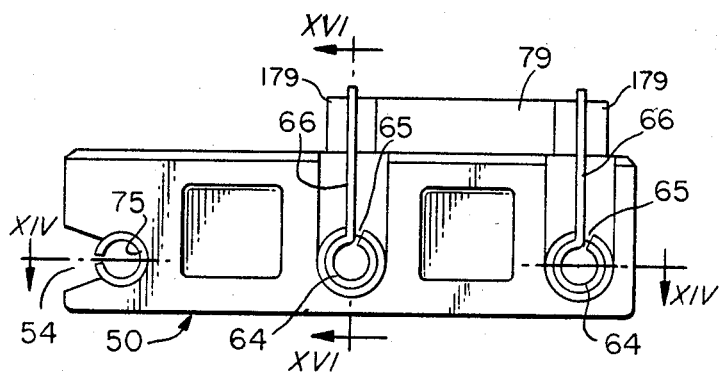
FIG. 15 is an underneath view of the component shown in FIGS. 10 to 13 with contact members in place and an electrical component present.
Figure 16:
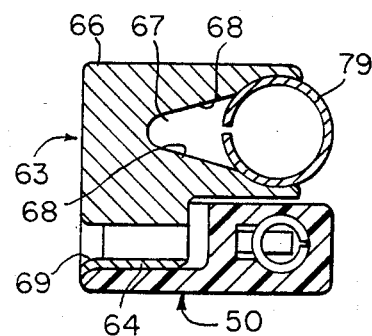
FIG. 16 is a section on the line XVI—XVI of FIG. 15.
Figure 17:
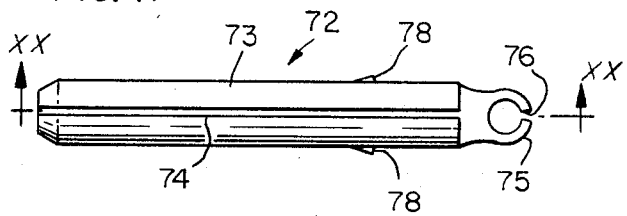
FIGS. 17, 18 and 19 are, respectively, plan, underneath and side views of one of the contact members.
Figure 18:
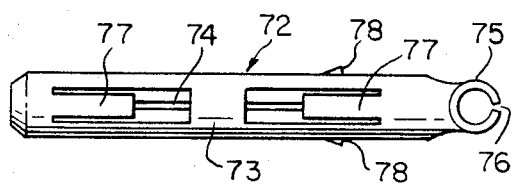
Figure 19:
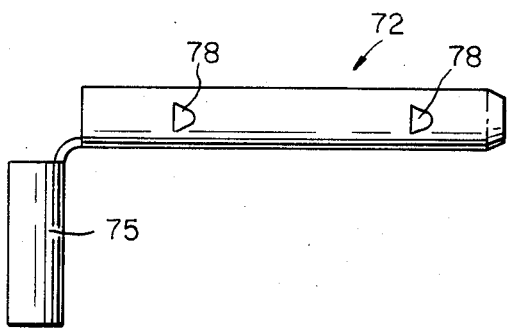

Associated with the carrier 50 are three connectors of an electrically-conductive material, and an example of one pair of which is shown in FIGS. 14 to 16, the third being shown in FIGS. 14 to 21.

FIGS. 14 to 16 show two connectors 63 pressed from sheet metal to form a first tubular portion 64 with a longitudinal slit 65 and a laterally-extending tongue 66. The tongue 66 is slotted as at 67, the walls 68 of the slot converging inwardly as can be seen from FIG. 16. Tongue 66 is of considerably greater height than the tubular portion 64, the latter being belled as indicated at 69.

Figure 20:
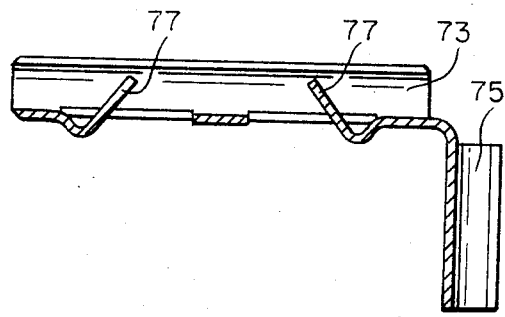
FIG. 20 is a section on the line XX—XX of FIG. 17.
Figure 21:
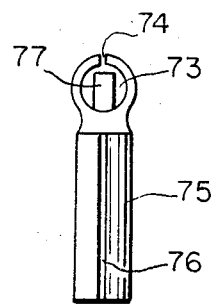
FIG. 21 is an end view of the contact member of FIGS. 17 to 20 taken from the left in FIG. 19.

The third connector 72 is shown in FIGS. 14 to 21. The connector 72 is also a metal pressing having a first tubular portion 73 divided longitudinally by a slot 74 and a second tubular portion 75 also with a longitudinal slot 76 and orientated with its axis at right angles to that of portion 73. The portion 73 has contact tongues 77 cantilevered inwardly as shown in FIGS. 14, 20 and 21, and external tongues 78.

The components described above are adapted to be assembled automatically by suitable machinery.

During assembly of the motor in accordance with the invention, the assembly machinery first presses the plain bearing 134 into molded-in heatsink 31, 32, 33 in end cap 12. The end cap so fitted with its bearing is then shifted to a position suitable for subsequent assembly operations.

A previously assembled stator complete with laminated stator stack, field windings and terminal blocks is then offered up to end cap 12 and located in position with the internal ledges 16a referred to above seated squarely on the end face 6 of the stator stack 1. The end cap 12 and stator stack is located with the annulus 27 uppermost over a spigot. A fibre washer, 136, is placed over the spigot.

A previously assembled rotor 9, is racked into the assembled stator with the fan end uppermost, the rotor 9 entering via the open end of the stator unit. End cap 11 is then positioned over the upper end of the rotor shaft 10 and advanced downwardly until its individual internal locating surfaces 16a+16b abut and locate squarely on the end face 6 of the stator stack 1.

Prior to positioning the end cap 11, gauge fingers measure the distance between the upper end face 5 of the stator stack and the fibre thrust washer on the upper end of the rotor shaft. The movement of the end cap 11 on to the rotor shaft until the locating surfaces 16a+16b bear against the stator end face 5 is also determined. The above measurement is subsequently used to determine the end float limits of the rotor 9 as will be described later.

The assembly machinery then inserts the self tapping screws 23 through the bosses 24 on end cap 11, through the appropriate passageways in the stator stack 1 and into the blind bores 38 in the support bosses 35. The blades of the fan 14 have previously been aligned to give the necessary clearance to permit insertion of the bolts 23 as just described.

In this way, the location of the end caps 11, 12 both axially and radially is determined from the end faces 5 and 6 of the laminated stator stack 1, and the alignment of the rotor bearings 19, 134 in the end caps with each other is ensured and consequently the correct alignment and location of the rotor 9.

Brush box sub-assemblies, comprising brushes 48 and springs 49 located in brush boxes 40 previously sub-assembled by the machinery, are then inserted laterally into the outer open ends of the mountings 36, the motor assembly having been rotated through 180° prior to the insertion of the brush box sub-assemblies. At this stage it should be noted that the brushes 48 are a tight fit in the brush boxes 40 and are so retained totally within the brush boxes so greatly facilitating handling.

The openings 41 of the brush boxes 40 engage the tapered rails 39 as the boxes enter the mounting 36. That engagement frees the brushes which move inwardly towards and into engagement with the commutator 13 under the bias of the springs 49. The insertion of the brush boxes 40 is continued, until the outwardly extending flanges 46 engage against the outer ends of the channel mountings 36, such engagement preventing further inward movement of the brush boxes. When in position, the boxes 40 are held in position against outward movement by the free ends of the tongues 43 engaging in the detent recesses 91 in the sides of the mountings 36.

After connector pins have been inserted into the terminal posts on the terminal block 2 adjacent the commutator 13 to extend the posts to a level at which electrical contact can be made therewith, sub-assemblies comprising carriers 50 fitted with connectors are located across the upper edges of the mountings 36, one such carrier 50 being shown in FIG. 1 and positioned in the manner just described.

In a typical example, the carrier 50 is fitted with a connector 72 and this is done automatically by feeding the portion 73 into the passageway 51 until the portion 75 locates fully in the passageway 53. Entry of the portion 75 is by way of the lateral opening 54 in the passageway 53. The parts of the tongues 77 that lie outside the tubular portion 73 slide along the keyway 52 of the passageway 51. Withdrawal of the connector 72 from the passageway 51 is prevented by the tongues 78 which dig into the wall of the passageway if removal is attempted.

At the same time as or subsequently to the insertion of the connector 72, connectors 63 are inserted from below the carrier 50 into the passageways 55 and 56. The tubular portions 64 are entered into the passageways, while the tongues 66 move into the respective slots 57. The belled lower end 69 of the portions 64 fit the correspondingly belled end of passageways 55 and 56.

Thus, as the carrier 50 with its connectors is moved into place, the pair of connector pins extending from the terminal block 2 that are aligned with the carrier enter the portions 64 and 75 of connectors 63 and 72 respectively. At the same time, the terminal tag 44 on the brush box 40 enters the portion 64 of the connector located in passageway 55. As can be understood from FIG. 1, each brush box 40 is inserted in the appropriate mounting support 36 with the side having the slot 41 facing rearwardly towards the bolt support 35. This orientation of the brush box locates the terminal tag 44 extending forwardly parallel to the axis of the rotor 9 and towards the left end of the motor as seen in FIG. 1. Although not shown, the ring-like terminal block 2 nearest the commutator 13 has a forwardly extending, i.e., to the left in FIG. 1, pair of terminals adjacent its top, and a similar pair adjacent its lower section. The upper pair of terminals, together with their previously mentioned connector pin extensions, are parallel to and in a common plane with the brush box terminal tag 44; the connector pins of this pair of upper field terminals being spaced apart opposite female connectors 64 and 76 in the carrier 50, and the terminal tag 44 being located opposite the middle female connector 64. Thus, as the carrier 50 is moved in a direction parallel to the rotor axis and towards the brush box assembly, the pair of terminal block connector pins and the brush box terminal tag 44 simultaneously enter their respective female connectors in the carrier 50. Although only one carrier 50 is shown in assembled position in FIGS. 1 and 3, it will be understood that a similar second carrier is assembled diametrically opposite against the other brush box assembly, this second carrier engaging the terminal tag of the other brush box and the lower pair of connector pins of the same terminal block 2.

Electrical connection from one end of one field winding to the appropriate brush 48 is completed by a choke 79 of cartridge fuse form with end connectors located in slots 67 of connectors 63, as shown in FIGS. 15 and 16, and making electrical connection therewith via the tongues 66. The choke 79 is positioned on the carrier 50 after the connectors have been placed in position thereon. The choke 79 comprises an induction coil of varnished or enamelled wire wound on a central core with a metal cap 179 at each end functioning as a connector. This choke of cartridge fuse form is simply pushed into the slots 67 in the metal tongues 66 which simultaneously physically support the choke and effect electrical connection thereto.

In some cases, a connector incorporating a conducting link can be used instead of the choke just described. The alternative form of link includes end connectors similar to those referred to in the preceding paragraph and is connected in a similar manner.

After the two carriers have been placed in position, either simultaneously or sequentially, the internal connections between the field windings and brushes of the motor is completed.

Connection to terminals by means of which connection is made to an external supply is effected by conductors inserted into the tubular portions 73 of the connectors 72, electrical contact being completed via one or other of the tongues 77 depending upon the direction of insertion of the conductors.

During the above assembly, after the end caps 11 and 12 have been positioned against the ends of the stator, and preferably immediately after the bolts 23 have secured the end caps in place, another important assembly step occurs. Consequential to the measurement obtained by the gauge fingers and to the distance subsequently moved by the end cap 11 on the rotor shaft until in final assembled position, the bearing 19 is pushed in and relative to the supporting heat sink extension 21 towards the fan 14 a computed distance to determine the end float of the rotor shaft 10. This is accomplished by holding the motor assembly in a cradle to prevent movement thereof and exerting inward axial pressure on the outer end of the bearing 19. In this respect it should be noted that the bearing 19 is a push fit in the heat sink, and the inner flange 20 of the heat sink is secured to the end cap 11 by dovetail-like projections engaging in the apertures 20a as shown in FIG. 4; also the end caps 11 and 12 are of robust construction even though they are provided with various openings to accommodate other components and the assembly thereof.

The above technique surprisingly enables the end float of the rotor shaft 10 to be controlled to within 0.4 mm, even though the various components such as the end caps, the bearings, the fiber thrust washer and the rotor shaft may have various production tolerances that could otherwise create an unwanted, and in some instances an unexceptable, build-up of tolerances. This technique has the further advantage of allowing more freedom in the tolerances of the involved components so reducing their cost of manufacture.

It will be appreciated that all electrical tests and mechanical tests can be carried out on the assembled unit shown in FIG. 1 prior to the removal of the unit from the assembly machinery before the unit is mounted in a power tool, and appropriate testing means are incorporated in the machinery referred to above.

Thus, the present invention provides a number of ingenious sub-assemblies and new methods for their assembly in the motor that further advance the automation of electric motor assembly.

The above described embodiments, of course, are not to be construed as limiting the breadth of the present invention. Modifications, and other alternative constructions, will be apparent which are within the spirit and scope of the invention as defined in the appended claims.

For example, reference has been made above to the provision of small extensions 30 (see FIG. 3) on the fingers 28. Those extensions provide supports and locks for alternatively holding and retaining a printed circuit board with the electrical connections referred to above formed on the board. The latter will also have sockets or connectors for making electrical contact with the terminal posts to which the ends of the field windings are connected. The printed circuit board may then be used in place of the carriers 50 described above in some circumstances.

What is claimed is:
1. An electric motor, comprising:
an armature having a commutator;
a brush resiliently urged towards said commutator;
a brush box in which said brush is located;
said brush box having two opposed walls with a slot therebetween, said two opposed walls being stressed to grip and hold against movement said brush;
a hollow brush box mounting having a wall with a rail, said rail protruding into the interior of said brush box mounting and extending parallel to said slot; and
said brush box being received within said brush box mounting with said rail forced into said slot and sufficiently separating said opposed walls to enable said brush to move in said brush box and contact said commutator.

2. The electric motor of claim 1, further comprising and end cap mounted on a stator assembly surrounding said armature, said end cap incorporating said brush box mounting.

3. The electric motor of claim 2, wherein said rail has at least a wedge-shaped end portion.

4. The electric motor of claim 3, wherein said rail extends the length of said brush box mounting with said wedge-shaped end portion extending outwards away from said commutator.

5. An electric motor, comprising:
a rotor having a shaft with a commutator;
a stator assembly surrounding the rotor and including a laminated stator stack;
first and second end caps each having location surfaces for locating the ends caps on the laminated stator stack with the location surfaces seated upon the end faces thereof;
first and second bearings incorporated respectively in said first and second end caps and supporting opposite ends of the rotor shaft;
said first end cap incorporating a brush box mounting of channel form, a wall of the channel having an upstanding rail with a wedge-shaped leading portion;
a brush box having at least two opposed walls stressed to grip and hold against movement a brush located within the box, the latter having defined in the periphery thereof a slot disposed between said opposed walls; and
said brush box being received within said channel form mounting with said rail forced into said slot and sufficiently separating said opposed walls to enable the brush to move in said brush box.

6. The electric motor of claim 5, wherein said brush box has a third wall between said opposed walls said third wall having outwardly extending flanges that define said slot.

7. The electric motor of claim 5, wherein each cap comprises an annular portion that fits over the respective end of said stator stack, said location surfaces being formed on the inner face of the annular portion.

8. The electric motor of claim 7, wherein
said first end cap includes fingers formed integrally with its annular portion, said fingers extending axially and converging inwardly and terminating in a boss having an overall diameter smaller than the annular portion;
a first heat sink mounted in said boss, said first bearing being mounted in said heat sink for assisting dissipation of heat generated in said first bearing, said heat sink comprising inner and outer annular members joined by a web apertured to permit the passage of air through the web;
said second end cap including fingers formed integrally with its annular portion and extending axially therefrom and supporting at their ends a disc-like member having a boss;
a second heat sink having a cylindrical portion mounted in said second end cap boss and carrying said second bearing, and having a disc portion connected to and forming part of said disc-like member; and
a fan mounted on said rotor shaft inside said second end cap for drawing cooling air through said apertured web of said first heat sink and discharging said cooling air radially outwards over said disc portion of said second heat sink.

9. The electric motor of claim 6, wherein:

said brush box has a fourth wall opposed to said third wall, said fourth wall having a terminal connector for said brush extending outwardly therefrom; and further comprising:

a carrier engaging said terminal connector and having a pair of laterally extending contact tongues having slots therein; and a choke in the form of a cartridge fuse and comprising an induction coil wound on a core with the ends of the coil being connected to metal end caps covering each end of the choke, the choke being mounted on said carrier with said end caps engaging in the slots of said contact tongues.

10. An electric motor, comprising:

a stator assembly;

an armature rotatable within said stator assembly and having a commutator;

a channel-shaped brush box mounting connected to said stator assembly and having a wall with an upstanding rail;

a brush box having two opposed walls stressed to grip and hold against movement a brush located within the brush box;

said brush box having a slot disposed between said opposed walls; and said brush box being received within said brush box mounting with said rail forced into said slot and sufficiently separating said opposed walls to enable said brush to move in said brush box and contact said commutator.

11. The electric motor of claim 10, wherein said rail is wedge-shaped.

12. The electric motor of claim 11, wherein said rail extends in a direction parallel to said slot.

* * * * *